US011128215B2

(12) United States Patent
Cao

(10) Patent No.: US 11,128,215 B2
(45) Date of Patent: Sep. 21, 2021

(54) DIRECT CURRENT VOLTAGE STEP-DOWN REGULATION CIRCUIT STRUCTURE

(71) Applicant: ZHENGZHOU YUNHAI INFORMATION TECHNOLOGY CO., LTD., Henan (CN)

(72) Inventor: Weihua Cao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 510 days.

(21) Appl. No.: 16/097,213

(22) PCT Filed: Dec. 28, 2017

(86) PCT No.: PCT/CN2017/119212
§ 371 (c)(1),
(2) Date: Oct. 26, 2018

(87) PCT Pub. No.: WO2019/029106
PCT Pub. Date: Feb. 14, 2019

(65) Prior Publication Data
US 2021/0226532 A1    Jul. 22, 2021

(30) Foreign Application Priority Data

Aug. 10, 2017 (CN) .......................... 201710681801.2

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0025* (2021.05); *H02M 3/072* (2021.05); *H02M 3/156* (2013.01)

(58) Field of Classification Search
CPC ...... H02M 1/0025; H02M 3/156; G05F 1/468
See application file for complete search history.

(56) References Cited

U.S. PATENT DOCUMENTS

| 5,773,963 A | 6/1998 | Blanc et al. |
| 2007/0090817 A1* | 4/2007 | Yee .......................... G05F 1/468 |
| | | 323/282 |

(Continued)

FOREIGN PATENT DOCUMENTS

| CN | 101546204 A | 9/2009 |
| CN | 105652949 A | 6/2016 |

(Continued)

OTHER PUBLICATIONS

International Search Report for PCT/CN2017/119212 dated Apr. 12, 2018, ISA/CN.

*Primary Examiner* — Alex Torres-Rivera
(74) *Attorney, Agent, or Firm* — Yue (Robert) Xu; Apex Attorneys at Law, LLP

(57) ABSTRACT

A direct current voltage step-down regulation circuit structure is provided, which includes a switching circuit and a feedback regulation circuit connected to the switching circuit. An output capacitor is arranged at an output end of the switching circuit, and the switching circuit receives an input voltage at an input end thereof. The feedback regulation circuit includes a first operational amplifier, a second operational amplifier and voltage division power supplies. A non-inverting input terminal of the first operational amplifier is connected to a first voltage division circuit. A non-inverting input terminal of the second operational amplifier is connected to a second voltage division circuit. The voltage division power supplies are respectively connected to the first voltage division circuit and the second voltage division circuit.

13 Claims, 2 Drawing Sheets

(51) Int. Cl.
    *H02M 3/156*    (2006.01)
    *H02M 3/07*     (2006.01)

(56) References Cited

U.S. PATENT DOCUMENTS

| | | | | |
|---|---|---|---|---|
| 2007/0120540 A1* | 5/2007 | Sase | ............... | H02M 3/156 |
| | | | | 323/222 |
| 2009/0039853 A1* | 2/2009 | Omi | ............... | H02M 3/156 |
| | | | | 323/284 |
| 2012/0146596 A1* | 6/2012 | Lin | ............... | H02M 3/156 |
| | | | | 323/265 |
| 2013/0193874 A1* | 8/2013 | Takahashi | ............... | H02M 3/156 |
| | | | | 315/297 |
| 2014/0253082 A1* | 9/2014 | Swanson | ............... | H02M 3/156 |
| | | | | 323/284 |
| 2014/0300336 A1* | 10/2014 | Li | ............... | H02M 3/156 |
| | | | | 323/285 |
| 2015/0355654 A1* | 12/2015 | Ueno | ............... | H02M 3/156 |
| | | | | 323/281 |
| 2016/0116927 A1 | 4/2016 | Chen | | |
| 2017/0310214 A1* | 10/2017 | Kawano | ............... | H02M 1/36 |
| 2018/0088613 A1* | 3/2018 | Muto | ............... | G05F 1/468 |
| 2018/0337591 A1* | 11/2018 | Shen | ............... | H02M 3/33507 |

FOREIGN PATENT DOCUMENTS

| | | |
|---|---|---|
| CN | 107425718 A | 12/2017 |
| CN | 207053395 U | 2/2018 |

* cited by examiner

DIRECT CURRENT VOLTAGE STEP-DOWN REGULATION CIRCUIT STRUCTURE

The present application is the national phase of PCT International Patent Application PCT/CN2017/119212, filed on Dec. 28, 2017 which claims the priority to Chinese Patent Application No. 201710681801.2, titled "DIRECT CURRENT VOLTAGE STEP-DOWN REGULATION CIRCUIT STRUCTURE", filed with the Chinese Patent Office on Aug. 10, 2017, both of which are incorporated herein by reference in their entireties.

FIELD

The present disclosure relates to the technical field of power supply voltage step-down regulation, and in particular to a direct current voltage step-down regulation circuit structure.

BACKGROUND

In existing electronic devices, direct current power supplied by a power supply is converted into a voltage required by chips. In a conventional direct current voltage step-down regulation circuit, a switching power supply is utilized to control an output inductor to be conducted or to be cut off by an input power supply based on choking current change characteristics of the output inductor, so as to perform voltage step-down regulation on an output voltage, which depends on a constant current in the output capacitor. However, the inductor needs to impede changes in the current, which results in disadvantages such as a slow regulation speed, an unavoidable inductor conduction loss and a limited conversion efficiency.

Further, the output inductor may be charged or discharged under control of the switching circuit. Since the inductor needs to impede changes in the current while maintaining the direction of the current, it is difficult to well perform the voltage step-down regulation on the output voltage by controlling the current, due to the slow regulation speed, the unavoidable inductor conduction loss, and the limited conversion efficiency. Further, it is required to select an appropriate inductor from various types of inductors, and the circuit structure is complex, which are disadvantageous.

SUMMARY

An object of the present disclosure is to provide a direct current voltage step-down regulation circuit structure, to solve the above technical problems.

In order to achieve the above object, the following technical solutions are provided in the present disclosure.

A direct current voltage step-down regulation circuit structure is provided, which includes a switching circuit and a feedback regulation circuit, where the switching circuit is connected to the feedback regulation circuit;

an output capacitor is arranged at an output end of the switching circuit;

the switching circuit is arranged to receive an input voltage at an input end of the switching circuit;

the feedback regulation circuit includes voltage division power supplies, a first operational amplifier and a second operational amplifier;

a non-inverting input terminal of the first operational amplifier is connected to a first voltage division circuit;

an inverting input terminal of the first operational amplifier is connected to the output capacitor;

a connection point between the non-inverting input terminal of the first operational amplifier and the first voltage division circuit is connected to a pull-down circuit;

an output terminal of the first operational amplifier is connected to the switching circuit;

a non-inverting input terminal of the second operational amplifier is connected to a second voltage division circuit;

an inverting input terminal of the second operational amplifier is connected to the inverting input terminal of the first operational amplifier;

an output terminal of the second operational amplifier is connected to the switching circuit;

the output terminal of the second operational amplifier is further connected to the pull-down circuit; and the voltage division power supplies are respectively connected to the first voltage division circuit and the second voltage division circuit.

Further, the switching circuit includes a first MOS transistor and a second MOS transistor;

a drain of the first MOS transistor is configured to receive the input voltage;

a gate of the first MOS transistor is connected to the output terminal of the second operational amplifier;

a source of the first MOS transistor is connected to a drain of the second MOS transistor via a first capacitor;

the source of the first MOS transistor is further connected to a source of the second MOS transistor via a second capacitor;

the source of the first MOS transistor is grounded via a third capacitor; and a gate of the second MOS transistor is connected to the output terminal of the first operational amplifier.

Further, the first voltage division circuit includes a first resistor and a second resistor;

the voltage division power supply is grounded sequentially via the first resistor and the second resistor; and a connection point between the first resistor and the second resistor is connected to the non-inverting input terminal of the first operational amplifier.

Further, the second voltage division circuit includes a third resistor and a fourth resistor; and the voltage division power supply is grounded sequentially via the third resistor and the fourth resistor Further, the pull-down circuit includes a fifth capacitor and a third MOS transistor;

the connection point between the non-inverting input terminal of the first operational amplifier and the first voltage division circuit is further connected to a source of the third MOS transistor via the fifth resistor;

the output terminal of the second operational amplifier is further connected to a gate of the third MOS transistor; and a drain of the third MOS transistor is grounded.

Further, a first terminal of the output capacitor serves as a power supply output terminal, and a second terminal of the output capacitor is grounded;

a connection point between the second capacitor and the source of the second MOS transistor is connected to the first terminal of the output capacitor; and a connection point between the inverting input terminal of the second operational amplifier and the inverting input terminal of the first operational amplifier is connected to the first terminal of the output capacitor.

Further, the voltage division power supplies are respectively connected to the first voltage division circuit and the second voltage division circuit, to generate different target voltages.

Further, a target output voltage is obtained by regulating a proportion of a sum of capacitances of the first capacitor and the second capacitor in circuit to a capacitance of the output capacitor using the switching circuit.

Further, each of the first MOS transistor, the second MOS transistor and the third MOS transistor is an N-channel MOS transistor.

Each of the voltage division power supplies outputs a voltage of 12V.

In the switching circuit, the first MOS transistor is used to control the input voltage to charge the first capacitor, the second capacitor, the third capacitor and the output capacitor. The second MOS transistor is used to control whether to switch the first capacitor into the circuit. The switching circuit is used to regulate the proportion of the sum of capacitances of the first capacitor and the second capacitor in circuit to the capacitance of the output capacitor, so as to obtain the target output voltage by the voltage division based on the proportion. The third capacitor, as a power storage capacitor, is used to supply power in a case that the first MOS transistor is turned off. The output voltage is equal to a value obtained by multiplying the proportion of the sum of capacitances of the first capacitor and the second capacitor to a sum of capacitances of the first capacitor, the second capacitor and the output capacitor by the input voltage.

The feedback control circuit includes the first voltage division circuit, the second voltage division circuit, the first operational amplifier, the second operational amplifier, the pull-down circuit, and voltage division power supplies. A target voltage generated by the voltage division using the first resistor and the second resistor is higher than a target voltage generated by the voltage division using the third resistor and the fourth resistor. The output voltage is compared with the target voltage generated by the voltage division using the first resistor and the second resistor. If the output voltage is lower than the target voltage generated by the voltage division using the first resistor and the second resistor, the first operational amplifier outputs a high voltage, so that the second MOS transistor enters into a turned-on state from the turned-off state. In this case, the first capacitor is switched into the circuit, and the proportion of the sum of capacitances of the first capacitor and the second capacitor in circuit to a sum of capacitances of the first capacitor, the second capacitor and the output capacitor is increased, and thus the output voltage is increased.

If the obtained voltage still does not meet requirements, the target voltage generated by the voltage division using the third resistor and the fourth resistor is triggered. In this case, the first operational amplifier outputs a high voltage, the first MOS transistor enters into a turned-on state from the turned-off state, and the input voltage is provided to the circuit, to charge the first capacitor, the second capacitor, the third capacitor and the output capacitor. Further, the third MOS transistor enters into a turned-on state from a turned-off state, so that the target voltage generated by the voltage division using the first resistor and the second resistor is decreased. Thus, the first operational amplifier outputs a low voltage prior to the second operational amplifier, and the second MOS transistor enters into the turned-off state from the turned-on state prior to the first MOS transistor, to delay the charging time of the input voltage to the circuit. When the output voltage is higher than the target voltage generated by the voltage division using the third resistor and the fourth resistor, the first MOS transistor enters into the turned-off state from the turned-on state, the charging is completed, and then the third capacitor supplies the power to maintain the voltage.

The output capacitor is used to supply power for the output voltage.

The present disclosure has the following advantageous effects. According to the technical solution provided in the present disclosure, the voltage step-down regulation is performed by the voltage division using capacitors, and no output inductor exists in circuit, which leads to a fast regulation speed and a high regulation efficient.

In addition, the design principle in the present disclosure is reliable, and a simple structure is adopted, so that the present disclosure can be widely applied.

Therefore, the present disclosure has outstanding substantive characteristics and technical improvements, and significant advantageous effects, compared with the conventional technology.

REFERENCE NUMERALS IN THE FIGURE

| | |
|---|---|
| 1 switching circuit, | 2 feedback regulation circuit, |
| 3 first voltage division circuit, | 4 second voltage division circuit, |
| 5 pull-down circuit, | M1 first operational amplifier, |
| M2 second operational amplifier, | Q1 first MOS transistor, |
| Q2 second MOS transistor, | Q3 third MOS transistor, |
| C1 first capacitor, | C2 second capacitor, |
| C3 third capacitor, | C4 fourth capacitor, |
| R1 first resistor, | R2 second resistor, |
| R3 third resistor, | R4 fourth resistor, |
| R5 fifth resistor, | VDD voltage division power supply, |
| Vin output voltage, | Vout output voltage. |

DETAILED DESCRIPTION OF EMBODIMENTS

The present disclosure is described below in detail in conjunction with the drawings by means of embodiments. The following embodiments are intended to illustrate the present disclosure, and the present disclosure is not limited thereto.

Figure 1:
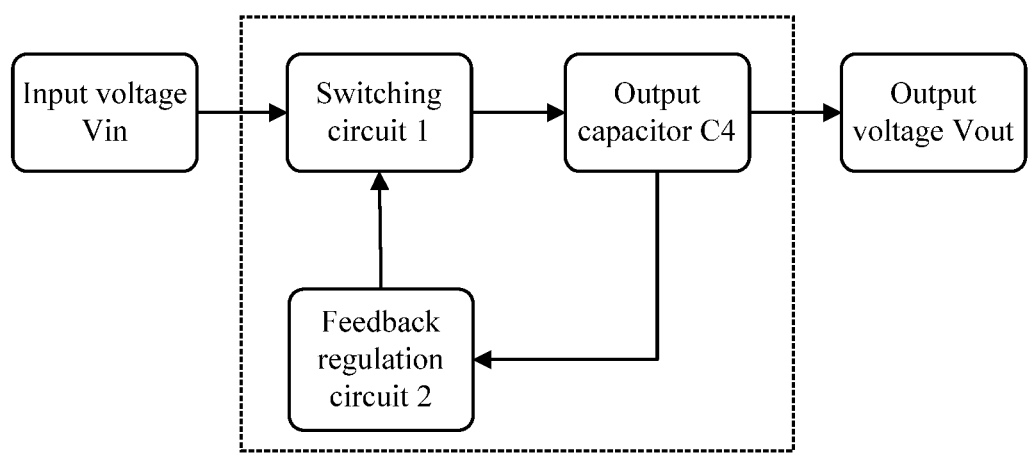
FIG. 1 is a block diagram of a direct current voltage step-down regulation circuit structure according to an embodiment of the present disclosure.
Figure 2:
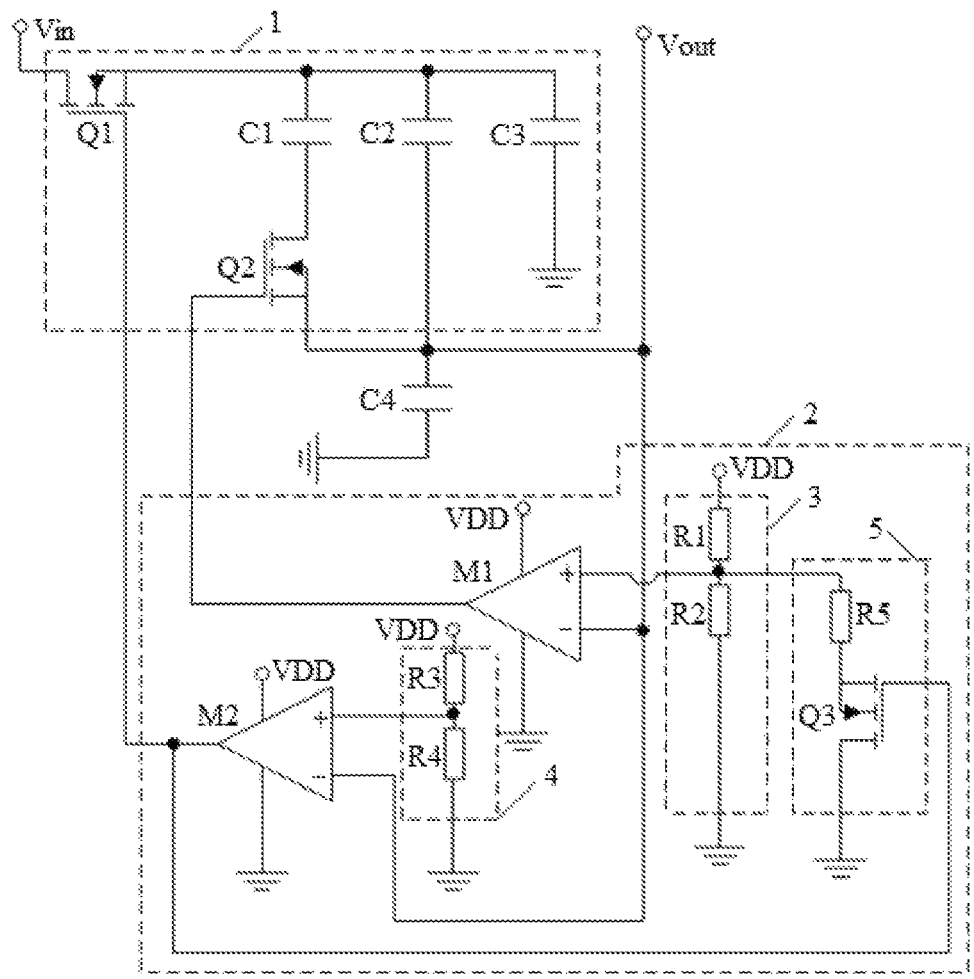
FIG. 2 is a circuit connection diagram of the direct current voltage step-down regulation circuit structure according to the embodiment of the present disclosure.

As shown in FIG. 1 and FIG. 2, a direct current voltage step-down regulation circuit structure is provided according to an embodiment of the present disclosure. The direct current voltage step-down regulation circuit structure includes a switching circuit 1 and a feedback regulation circuit 2. The switching circuit 1 is connected to the feedback regulation circuit 2. An output capacitor C4 is arranged at an output end of the switching circuit 2.

The switching circuit 1 is arranged to receive an input voltage Vin at an input end of the switching circuit 1.

The feedback regulation circuit 2 includes: voltage division power supplies VDDs, a first operational amplifier M1, and a second operational amplifier M2.

A non-inverting input terminal of the first operational amplifier M1 is connected to a first voltage division circuit 3.

An inverting input terminal of the first operational amplifier M1 is connected to the output capacitor C4.

A connection point between the non-inverting input terminal of the first operational amplifier M1 and the first voltage division circuit 3 is connected to a pull-down circuit 5.

An output terminal of the first operational amplifier M1 is connected to the switching circuit 1.

A non-inverting input terminal of the second operational amplifier M2 is connected to a second voltage division circuit 4.

An inverting input terminal of the second operational amplifier M2 is connected to the inverting input terminal of the first operational amplifier M1.

An output terminal of the second operational amplifier M2 is connected to the switching circuit 1.

The output terminal of the second operational amplifier M2 is further connected to the pull-down circuit 5.

The voltage division power supplies VDDs are respectively connected to the first voltage division circuit 2 and the second voltage division circuit 4.

The switching circuit 1 includes a first MOS transistor Q1 and a second MOOS transistor Q2.

A drain of the first MOS transistor Q1 is configured to receive the input voltage Vin.

A gate of the first MOS transistor Q1 is connected to the output terminal of the second operational amplifier M2.

A source of the first MOS transistor Q1 is connected to a drain of the second MOS transistor Q2 via a first capacitor C1.

The source of the first MOS transistor Q1 is further connected to a source of the second MOS transistor Q2 via a second capacitor C2.

The source of the first MOS transistor Q1 is grounded via a third capacitor C3.

A gate of the second MOS transistor Q2 is connected to the output terminal of the first operational amplifier M1.

The first voltage division circuit 3 includes a first resistor R1 and a second resistor R2.

The voltage division power supply VDD, that outputs a voltage of 12V is grounded sequentially via the first resistor R1 and the second resistor R2.

A connection point between the first resistor R1 and the second resistor R2 is connected to the non-inverting input terminal of the first operational amplifier M1.

The second voltage division circuit 4 includes a third resistor R3 and a fourth resistor R4.

The voltage division power supply VDD is grounded sequentially via the third resistor R3 and the fourth resistor R4.

The pull-down circuit 5 includes a fifth capacitor R5 and a third MOS transistor Q3.

The connection point between the non-inverting input terminal of the first operational amplifier M1 and the first voltage division circuit 3 is further connected to a source of the third MOS transistor Q3 via the fifth resistor R5.

The output terminal of the second operational amplifier M2 is further connected to a gate of the third MOS transistor Q3.

A drain of the third MOS transistor Q3 is grounded.

A first terminal of the output capacitor C4 serves as a power supply output terminal, and a second terminal of the output capacitor C4 is grounded.

A connection point between the second capacitor C2 and the source of the second MOS transistor Q2 is connected to the first terminal of the output capacitor C4.

A connection point between the inverting input terminal of the second operational amplifier M2 and the inverting input terminal of the first operational amplifier M1 is connected to the first terminal of the output capacitor C4.

The voltage division power supplies VDDs are respectively connected to the first voltage division circuit 3 and the second voltage division circuit 4, to generate different target voltages.

A target output voltage is obtained by regulating a proportion of a sum of capacitances of the first capacitor C1 and the second capacitor C2 in circuit to a capacitance of the output capacitor C4 using the switching circuit 1.

Each of the first MOS transistor Q1, the second MOS transistor Q2 and the third MOS transistor Q3 is an N-channel MOS transistor.

The voltage of 12V is provided to a third pin of the first operational amplifier M1, and a fourth pin of the first operational amplifier M1 is grounded.

The voltage of 12V is provided to a third pin of the second operational amplifier M2, and a fourth pin of the second operational amplifier M2 is grounded.

In the switching circuit 1, the first MOS transistor Q1 is used to control the input voltage Vin to charge the first capacitor C1, the second capacitor C2, the third capacitor C3 and the output capacitor C4. The second MOS transistor Q2 is used to control whether to switch the first capacitor C2 into the circuit. The switching circuit 1 is used to regulate the proportion of the sum of capacitances of the first capacitor C1 and the second capacitor C2 in circuit to the capacitance of the output capacitor C4, so as to obtain the target output voltage by the voltage division based on the proportion. The third capacitor C3, as a power storage capacitor, is used to supply power in a case that the first MOS transistor Q1 is turned off. The output voltage Vout is equal to a value obtained by multiplying the proportion of the sum of capacitances of the first capacitor C1 and the second capacitor C2 to a sum of capacitances of the first capacitor C1, the second capacitor C2 and the output capacitor C4 by the input voltage Vin.

$$Vout=Vin*(C1+C2)/(C1+C2+C4)$$

The feedback regulation circuit 2 includes the first voltage division circuit 3, the second voltage division circuit 4, the first operational amplifier M1, the second operational amplifier M2, the pull-down circuit 5, and voltage division power supplies VDDs. A target voltage generated by the voltage division using the first resistor R1 and the second resistor R2 is higher than a target voltage generated by the voltage division using the third resistor R3 and the fourth resistor R4. The output voltage Vout is compared with the target voltage generated by the voltage division using the first resistor R1 and the second resistor R2. If the output voltage Vout is lower than the target voltage generated by the voltage division using the first resistor R1 and the second resistor R2, the first operational amplifier M1 outputs a high voltage, so that the second MOS transistor Q2 enters into a turned-on state from the turned-off state. In this case, the first capacitor C1 is switched into the circuit, and the proportion of the sum of capacitances of the first capacitor C1 and the second capacitor C2 in circuit to a sum of capacitances of the first capacitor C1, the second capacitor C2 and the output capacitor C4 is increased, and thus the output voltage is increased.

If the obtained voltage still does not meet requirements, the target voltage generated by the voltage division using the third resistor R3 and the fourth resistor R4 is triggered. In this case, the first operational amplifier M1 outputs a high voltage, the first MOS transistor Q1 enters into a turned-on state from the turned-off state, and the input voltage Vin is provided to the circuit, to charge the first capacitor C1, the second capacitor C2, the third capacitor C3 and the output capacitor C4. Further, the third MOS transistor Q3 enters into a turned-on state from a turned-off state, so that the target voltage generated by the voltage division using the first resistor R1 and the second resistor R2 is decreased. Thus, the first operational amplifier M1 outputs a low voltage prior to the second operational amplifier M2, and the second MOS transistor Q2 enters into the turned-off state from the turned-on state prior to the first MOS transistor Q1, to delay the charging time of the input voltage to the circuit. When the output voltage Vout is higher than the target voltage generated by the voltage division using the third resistor R3 and the fourth resistor R4, the first MOS transistor Q1 enters into the turned-off state from the turned-on state, the charging is completed, and then the third capacitor C3 supplies the power to maintain the voltage.

The first terminal of the output capacitor C4 is a voltage output terminal, and the output capacitor C4 is used to supply power for the output voltage.

The embodiment disclosed above is only a preferred embodiment of the present disclosure, and the present disclosure is not limited thereto. Any non-inventive changes made by those skilled in the art, and improvements and modifications made by those skilled in the art without departing from the principle of the present disclosure fall into the protection scope of the present disclosure.

The invention claimed is:

1. A direct current voltage step-down regulation circuit structure, comprising:
a switching circuit, wherein an output capacitor is arranged at an output end of the switching circuit, and the switching circuit is arranged to receive an input voltage at an input end of the switching circuit; and
a feedback regulation circuit comprising a first operational amplifier, a second operational amplifier and voltage division power supplies, wherein the switching circuit is connected to the feedback regulation circuit;
a non-inverting input terminal of the first operational amplifier is connected to a first voltage division circuit;
an inverting input terminal of the first operational amplifier is connected to the output capacitor;
a connection point between the non-inverting input terminal of the first operational amplifier and the first voltage division circuit is connected to a pull-down circuit;
an output terminal of the first operational amplifier is connected to the switching circuit;
a non-inverting input terminal of the second operational amplifier is connected to a second voltage division circuit;
an inverting input terminal of the second operational amplifier is connected to the inverting input terminal of the first operational amplifier;
an output terminal of the second operational amplifier is connected to the switching circuit;
the output terminal of the second operational amplifier is further connected to the pull-down circuit; and
the voltage division power supplies are respectively connected to the first voltage division circuit and the second voltage division circuit.

2. The direct current voltage step-down regulation circuit structure according to claim 1, wherein the switching circuit comprises:
a first MOS transistor; and
a second MOOS transistor, wherein
a drain of the first MOS transistor is configured to receive the input voltage;
a gate of the first MOS transistor is connected to the output terminal of the second operational amplifier;
a source of the first MOS transistor is connected to a drain of the second MOS transistor via a first capacitor;
the source of the first MOS transistor is further connected to a source of the second MOS transistor via a second capacitor;
the source of the first MOS transistor is grounded via a third capacitor; and
a gate of the second MOS transistor is connected to the output terminal of the first operational amplifier.

3. The direct current voltage step-down regulation circuit structure according to claim 2, wherein the first voltage division circuit comprises:
a first resistor; and
a second resistor, wherein
the voltage division power supply connected to the first voltage division circuit is grounded sequentially via the first resistor and the second resistor; and
a connection point between the first resistor and the second resistor is connected to the non-inverting input terminal of the first operational amplifier.

4. The direct current voltage step-down regulation circuit structure according to claim 2, wherein the second voltage division circuit comprises:
a third resistor; and
a fourth resistor, wherein
the voltage division power supply connected to the second voltage division circuit is grounded sequentially via the third resistor and the fourth resistor; and
a connection point between the third resistor and the fourth resistor is connected to the non- inverting input terminal of the second operational amplifier.

5. The direct current voltage step-down regulation circuit structure according to claim 4, wherein the pull-down circuit comprises:
a fifth capacitor; and
a third MOS transistor, wherein the connection point between the non-inverting input terminal of the first operational amplifier and the first voltage division circuit is further connected to a source of the third MOS transistor via a fifth resistor;
the output terminal of the second operational amplifier is further connected to a gate of the third MOS transistor; and
a drain of the third MOS transistor is grounded.

6. The direct current voltage step-down regulation circuit structure according to claim 5, wherein
a first terminal of the output capacitor serves as a power supply output terminal, and a second terminal of the output capacitor is grounded;
a connection point between the second capacitor and the source of the second MOS transistor is connected to the first terminal of the output capacitor; and
a connection point between the inverting input terminal of the second operational amplifier and the inverting input terminal of the first operational amplifier is connected to the first terminal of the output capacitor.

7. The direct current voltage step-down regulation circuit structure according to claim 6, wherein the voltage division power supplies are respectively connected to the first voltage division circuit and the second voltage division circuit, to generate different target voltages.

8. The direct current voltage step-down regulation circuit structure according to claim 7, wherein a target output voltage is obtained by regulating a proportion of a sum of capacitances of the first capacitor and the second capacitor in the switching circuit to a capacitance of the output capacitor using the switching circuit.

9. The direct current voltage step-down regulation circuit structure according to claim 3, wherein the second voltage division circuit comprises:
 a third resistor; and
 a fourth resistor, wherein
 the voltage division power supply is grounded sequentially via the third resistor and the fourth resistor; and
 a connection point between the third resistor and the fourth resistor is connected to the non-inverting input terminal of the second operational amplifier.

10. The direct current voltage step-down regulation circuit structure according to claim 9, wherein the pull-down circuit comprises:
 a fifth capacitor; and
 a third MOS transistor, wherein
 the connection point between the non-inverting input terminal of the first operational amplifier and the first voltage division circuit is further connected to a source of the third MOS transistor via a fifth resistor;
 the output terminal of the second operational amplifier is further connected to a gate of the third MOS transistor; and
 a drain of the third MOS transistor is grounded.

11. The direct current voltage step-down regulation circuit structure according to claim 10, wherein
 a first terminal of the output capacitor serves as a power supply output terminal, and a second terminal of the output capacitor is grounded;
 a connection point between the second capacitor and the source of the second MOS transistor is connected to the first terminal of the output capacitor; and
 a connection point between the inverting input terminal of the second operational amplifier and the inverting input terminal of the first operational amplifier is connected to the first terminal of the output capacitor.

12. The direct current voltage step-down regulation circuit structure according to claim 11, wherein the voltage division power supplies are respectively connected to the first voltage division circuit and the second voltage division circuit, to generate different target voltages.

13. The direct current voltage step-down regulation circuit structure according to claim 12, wherein a target output voltage is obtained by regulating a proportion of a sum of capacitances of the first capacitor and the second capacitor in the switching circuit to a capacitance of the output capacitor using the switching circuit.

* * * * *